(12) United States Patent
Zettel et al.

(10) Patent No.: US 6,533,977 B1
(45) Date of Patent: Mar. 18, 2003

(54) HIGH TEMPERATURE COMPOSITE STRUCTURE AND METHOD OF MANUFACTURING SAME

(75) Inventors: Steven A. Zettel, Cranston, RI (US); Zlatomir Kircanski, Cumberland, RI (US)

(73) Assignee: ACS Industries, Inc., Woonsocket, RI (US)

( * ) Notice: Subject to any disclaimer, the term of this patent is extended or adjusted under 35 U.S.C. 154(b) by 0 days.

(21) Appl. No.: 08/987,975

(22) Filed: Dec. 10, 1997

(51) Int. Cl.⁷ .............................. B28D 1/32; D04H 1/20
(52) U.S. Cl. ................... 264/110; 264/112; 264/103; 264/138; 264/257; 442/136; 442/138; 442/140; 442/147
(58) Field of Search ................................. 264/103, 138, 264/257, 110, 112; 442/136, 147, 138, 140

(56) References Cited

U.S. PATENT DOCUMENTS

| | | | |
|---|---|---|---|
| 3,186,042 A | | 6/1965 | Daley .................... 277/651 |
| 3,817,719 A | * | 6/1974 | Schilke et al. ............ 29/182.5 |
| 4,443,517 A | | 4/1984 | Shah ..................... 442/322 |
| 4,463,959 A | | 8/1984 | Usher et al. .............. 277/608 |
| 4,590,025 A | * | 5/1986 | Reiter et al. .............. 264/103 |
| 4,601,476 A | | 7/1986 | Usher et al. .............. 217/627 |
| 4,659,091 A | | 4/1987 | Baasner et al. ............ 428/34.5 |
| 4,756,561 A | | 7/1988 | Kawata et al. ............ 285/187 |
| 4,762,330 A | | 8/1988 | Lönne et al. .............. 277/627 |
| 4,955,218 A | * | 9/1990 | Brandener ................ 72/146 |
| 5,462,291 A | * | 10/1995 | Maeda et al. ............. 277/100 |
| 5,499,825 A | | 3/1996 | Maeda et al. ............. 277/626 |
| 5,506,061 A | * | 4/1996 | Kindl et al. .............. 428/549 |
| 6,025,018 A | * | 2/2000 | Goldman et al. .......... 427/178 |

FOREIGN PATENT DOCUMENTS

| | | |
|---|---|---|
| GB | 2 159 588 A | 12/1985 |
| GB | 2 159 588 | * 12/1985 |

* cited by examiner

Primary Examiner—Elizabeth M. Cole
Assistant Examiner—John J Guarriello
(74) Attorney, Agent, or Firm—Bradley Ruben

(57) ABSTRACT

A high temperature, composite structure includes a blank of wire mesh material fabricated from drawn wire from a stainless steel rod. The drawn wire is annealed and mixed to create raw material. The mixed raw material is knitted to create the blank of wire mesh material, the blank of wire mesh material having voids formed therein. A dispersion comprising vermiculite as a binder is impregnated within the blank of wire mesh material. The dispersion substantially fills the voids of the blank of wire mesh material. A method of manufacturing the structure is further disclosed. Specifically, the method includes the steps of providing a blank of wire mesh material having voids formed therein, impregnating the blank of wire mesh material with a dispersion consisting of vermiculite, the dispersion substantially filling the voids, eliminating a water fraction of the dispersion, and pressing the impregnated blank of wire mesh material to a desired shape and density.

11 Claims, 2 Drawing Sheets

HIGH TEMPERATURE COMPOSITE STRUCTURE AND METHOD OF MANUFACTURING SAME

BACKGROUND OF THE INVENTION

This invention relates generally to seals and gaskets and methods of producing same, and more particularly to an automotive seal that is especially suited for preventing leakage therethrough and to a novel method of producing such a seal.

Gaskets and/or seals are well known in the art. In this regard, reference can be made to any of the following U.S. patents as representative prior art in this area: U.S. Pat. No. 3,186,042 to Daley; U.S. Pat. No. 4,443,517 to Shah; U.S. Pat. No. 4,601,476 to Usher et al.; U.S. Pat. No. 4,659,091 to Baasner et al.; and U.S. Pat. No. 4,756,561 to Kawata et al. Although each of the foregoing patents disclose gaskets and/or seals that are suitable for their intended purpose, there is presently a need in the automotive industry for a structure that prevents leakage when used on an automobile exhaust system.

The high temperature, composite structure disclosed herein addresses this need, as well as other related needs.

SUMMARY OF THE INVENTION

In general, the present invention is directed to a high temperature, composite structure comprising a blank of wire mesh material fabricated from drawn wire from a stainless steel rod. The drawn wire is annealed and knitted to create the blank of wire mesh material, the blank of wire mesh material having voids formed therein. A dispersion comprising vermiculite as a binder is impregnated within the blank of wire mesh material. The dispersion substantially fills the voids of the blank of wire mesh material. Preferably, the blank of wire mesh material will fill a volume of 20% to 70% of a preform prior to it being impregnated by the dispersion.

A method of manufacturing the structure comprises the steps of: (a) providing a blank of wire mesh material having voids formed therein; (b) impregnating the blank of wire mesh material with a dispersion consisting of vermiculite as a binder, the dispersion substantially filling the voids; (c) eliminating a water fraction of the dispersion; and (d) pressing the impregnated blank of wire mesh material to a desired shape and density.

More particularly, the step of providing a blank of wire mesh material comprises the steps of drawing wire from a stainless steel rod, annealing the drawn wire, mixing, and knitting the drawn wire to create said blank of wire mesh material. Prior to the impregnating step, the method further comprises the step of preforming the blank of wire mesh material into a first predetermined shape. The blank of wire mesh material can further be impregnated at least one more time.

Accordingly, among the several objects of the present invention are: the provision of structure that is capable of preventing leakage when used on an automobile exhaust system; the provision of such a structure that is capable of withstanding relatively high compression forces applied thereon; the provision of such a structure having chemical and physical characteristics which prevent it from degrading under high temperature; the provision of such a structure that is easy to install during the assembly of the automobile exhaust system; the provision of such a structure that is capable of withstanding axial, radial and shearing forces; and the provision of such a structure that is cost-efficient to manufacture.

Other objects, features and advantages of the invention shall become apparent as the description thereof proceeds.

BRIEF DESCRIPTION OF THE DRAWINGS

In the drawings which illustrate the best mode presently contemplated for carrying out the present invention.

Corresponding reference numerals designate corresponding parts throughout the several views of the drawings.

DETAILED DESCRIPTION OF THE INVENTION

Figure 1:
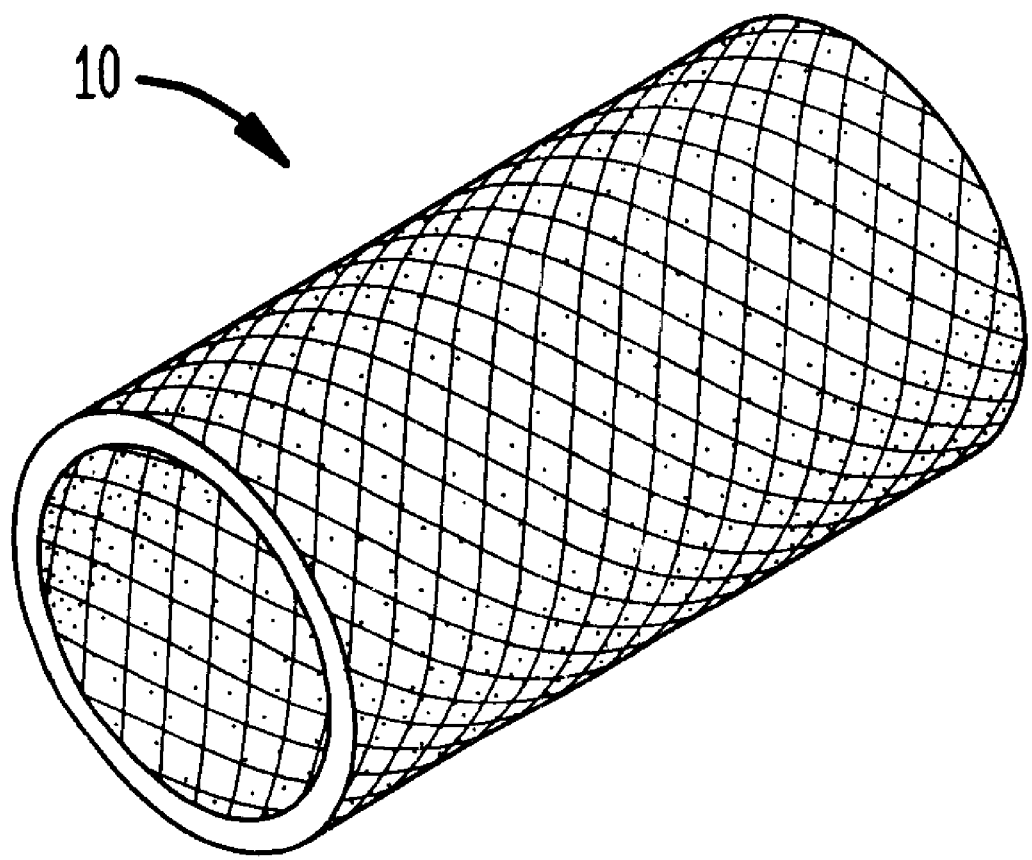
FIG. 1 is a front perspective view of a high temperature, composite structure of the present invention.

Referring now to the drawings, and more particularly to FIG. 1, there is generally indicated at 10 a high temperature, composite structure of the present invention. As will be discussed in greater detail below, the structure 10 is especially suited for use in an automobile exhaust system. Regardless of its intended use, the structure 10 is suited for uses where it is subjected to mechanical loading, vibrational energy, and ambient or high temperature conditions. In addition, it can be used in situations where it is desired to insulate the material it surrounds thereby preventing the transfer of heat to surrounding components. The structure 10 of the present invention is particularly effective in preventing leakage of automobile exhaust when used for coupling components of the system to one another.

The structure 10 shown in FIG. 1 is for illustration purposes only. It should be understood that the structure 10 can embody any number of different shapes and sizes and still fall within the scope of the present invention.

Figure 2:
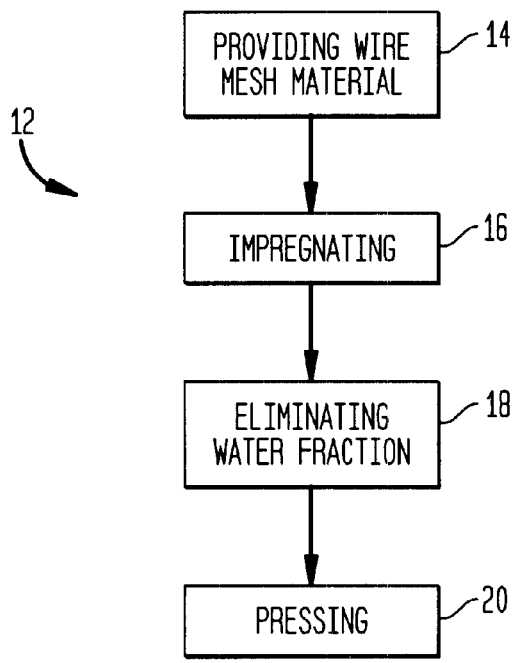
FIG. 2 is a schematic, block diagram of a method of manufacturing the structure illustrated in FIG. 1.
Figure 3:
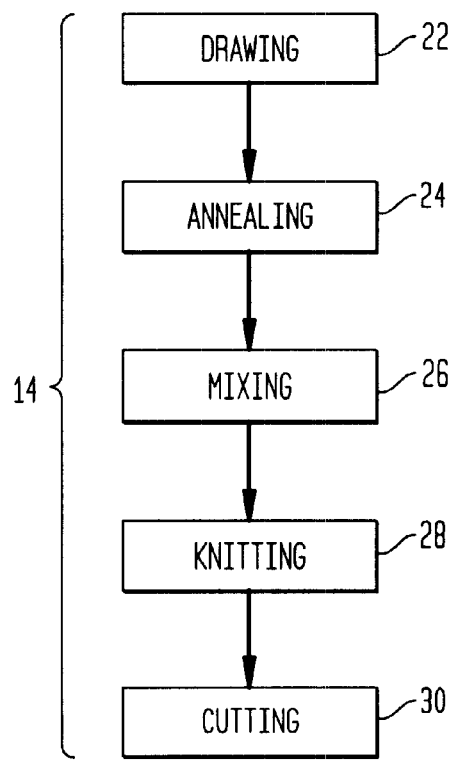
FIG. 3 is a schematic, block diagram of the step of providing wire mesh material illustrated in FIG. 2.

Turning now to FIGS. 2 and 3, and FIG. 2 in particular, there is generally indicated at 12 in schematic form a block diagram illustrating a preferred method of manufacturing the structure 10. As shown, the method comprises the steps of providing a blank of wire mesh material, impregnating the blank with a dispersion, eliminating water fraction from the dispersion held within the blank, and pressing the blank of wire mesh material into its final form. These four steps are indicated by reference numerals 14, 16, 18, and 20, respectively.

Step 14 requires providing a blank of wire mesh material fabricated from drawn wire. Reference is made to FIG. 3 which illustrates the sub-steps of step 14. Preferably, the drawn wire is taken from a stainless steel rod that meets the requirements of ASTM A580, or any appropriate chrome and chrome-nickel alloy, and has a diameter between 0.272 mm and 0.287 mm. This sub-step is represented by reference numeral 22 in FIG. 3. It should be noted that the wire diameters can range between 0.10 mm to 0.50 mm, as long as the wire can be knitted or woven. The drawn wire is annealed at a temperature between 1,950° F. and 2,050° F., and is represented by reference numeral 24 in FIG. 3. The annealed, drawn wire is then mixed to create raw material (sub-step 26) and knitted (sub-step 28) by means of a forty-eight needle knitting machine which is well known in the art to create the wire mesh material. After knitting, the wire mesh material is cut as shown by sub-step 30 to a predetermined length and preformed by a compression die. Preferably, the blank of wire mesh material will fill a volume of 20% to 70% of a preform prior to it being impregnated by the dispersion.

It should be noted that other fabrication methods such as weaving and the like can be used and still fall within the scope of the present invention.

As shown in FIG. 2, a dispersion is impregnated in step 16 within the voids of the blank of wire mesh material. The dispersion consists of vermiculite as a binder modified to have boron nitride mica powder added thereto. After initially impregnating the blank of wire mesh material with the dispersion, a water fraction of the dispersion is removed in step 18 by drying the blank in an oven at approximately 300° F. The impregnation step 16 can be achieved by dipping the blank of wire mesh material into a vat having the dispersion therein. It is desirable to impregnate the blank so that the voids are filled with the dispersion. If, after initially impregnating the blank of wire mesh material, the voids are not substantially filled, the blank can again be immersed in the vat any number of times until the voids are filled. After each immersion into the vat, the water fraction should be dried in the manner described above.

After impregnating the blank, it is formed into its final shape by another compression die in step 20. Once pressed, the structure is in its final form and ready for use.

As this invention may embody several forms without departing from the spirit or essential characteristics thereof, the present embodiment is therefore illustrative and not restrictive, since the scope of the invention is defined by the appended claims rather than by the description preceding them, and all changes that fall within the metes and bounds of the claims or that form their functional as well as conjointly cooperative equivalents, are therefore intended to be embraced by these claims.

What is claimed is:

1. A method of manufacturing a high temperature composite structure suitable for use in the exhaust system of an internal combustion engine, comprising, in sequential order, the steps of:

(a) providing a preform of wire mesh material having voids formed therein;

(b) compressing said preform in a die;

(c) impregnating the compressed preform of wire mesh material with an aqueous dispersion consisting essentially of vermiculite as a binder, said dispersion substantially filling said voids;

(d) eliminating the water fraction of the impregnated dispersion; and (e) pressing the impregnated preform of wire mesh material into a desired shape and density.

2. The method set forth in claim 1, said step of providing a blank of wire mesh material comprising the steps of:

drawing wire from a stainless steel rod to produce drawn wire;

annealing the drawn wire; and knitting the annealed, drawn wire to create said blank of wire mesh material.

3. The method set forth in claim 2, said step of providing a blank of wire mesh material further comprising the step of cutting the blank of wire mesh material to a predetermined length.

4. The method set forth in claim 1, prior to said impregnating step, further comprising the step of preforming the blank of wire mesh material into a first predetermined shape.

5. The method set forth in claim 4, said preforming step being achieved by a compression die.

6. The method set forth in claim 1, said dispersion further including boron nitride and mica powder.

7. The method set forth in claim 1, prior to said pressing step, comprising the steps of:

impregnating the blank of wire mesh material with said dispersion at least one more time; and eliminating the water fraction of the dispersion.

8. The method set forth in claim 1, said water fraction eliminating step being achieved with a high temperature oven.

9. The method set forth in claim 1, said step of eliminating a water fraction of the dispersion being achieved by an oven.

10. The method set forth in claim 1, said pressing step being achieved by a compression die.

11. The method of claim 1, wherein the preform is compressed to 20% to 70% of its original volume.

* * * * *